United States Patent Office 3,001,977
Patented Sept. 26, 1961

3,001,977
RECOVERY OF PURE OLEFINE POLYMERS
Karl Wisseroth, Ernst-Guenther Kastning, and Hans-Georg Trieschmann, all of Ludwigshafen (Rhine), Germany, assignors to Badische Anilin- & Soda-Fabrik Aktiengesellschaft, Ludwigshafen (Rhine), Germany
No Drawing. Filed Aug. 6, 1957, Ser. No. 676,499
Claims priority, application Germany Aug. 17, 1956
12 Claims. (Cl. 260—93.7)

This invention relates to a process for the purification of crude olefine polymers, which contain inorganic catalyst residues.

It is already known to polymerize olefine hydrocarbons, especially ethylene, in the presence of solvents and catalysts, to products of very different degrees of polymerization, such as oils, fats, waxes and film-forming products of very high degree of polymerization. As catalysts there are used for example mixtures of compounds, preferably halogen compounds, of metals, of the 4th to 6th sub-groups of the periodic system which contain, if desired in addition to aluminum chloride, also free metals, for example alkali metals, aluminum, zinc, magnesium "ferrum reductum" and the like. It is difficult however to obtain polymers of a very high degree of purity, i.e. free from inorganic residual constituents of the catalysts used. The special difficulty lies above all in the fact that the catalyst residues are present in the polymerization mixture partly in dissolved form, partly as solid particles and partly in a form completely enclosed by the polymer. By treatment of the polymer in the cold, or even at elevated temperature, with methanol, aqueous acids, tetrahydrofurane and the like, only the dissolved fraction or the solid particles of the catalyst residue which are soluble in these solvents are effected. The catalyst residues enveloped by the polymer are not affected by this treatment.

We have now found that a complete separation of the inorganic catalyst residues from the polymer can be achieved by allowing a precipitant to act on the solutions obtained by the polymerization process or by subsequent dissolution of the crude polymers in organic solvents at elevated temperature, in order to precipitate inorganic catalyst residues which are still dissolved, and then adding a substance having a large surface for the complete removal of the partially colloidally dispersed solid substances thereby formed, and then effecting mechanical separation. The liquid filtrate containing the polymer can be separated from undissolved matter by sedimentation, centrifuging or filtration. Surprisingly it is found by this treatment that the finely divided inorganic residues are united with considerable strength to the surface-active substance so that no trace of the attached residue is given up thereby even by the action of pure solvent.

The surface-active substance added as filtration or sedimentation aids can be of different nature and may belong to different classes of substances. They should have the property of extracting the mainly inorganic impurities, in part very finely divided, from the polymer solution and binding them firmly in their structure which is the property of adsorbing materials or adsorbents. It is advantageous to use the added auxiliary in a relatively coarse granulation in order to achieve an easy separation from the solution, preferably by sedimentation. They may also be added before or during the polymerization. As such filtration or sedimentation aids there may be used for example inorganic substances having large surfaces like gamma-aluminum oxide, silicon dioxide, kieselguhr, bleaching earths, bentonite or montmorrillonite.

For carrying out the present process it has proved to be preferable to allow the polymerization to proceed only to such an extent that the whole of the polymer formed still dissolves readily.

The temperature necessary for the treatment both with the precipitant and with the filtration aids is determined essentially by the solubility of the polymer. The purification is preferably carried out at temperatures above 80° C.

Since the solubility decreases with increasing molecular weight at a given temperature, but increases quite generally with increasing temperature, it is preferable to use solvents which boil higher than 130° C., as for example xylene, ethylbenzene, diethylbenzene, isopropylbenzene, di-isopropylbenzene, tri-isopropylbenzene and the like. If these solvents are used it is possible in the case of polymers with an average molecular weight of about 100,000 to prepare without difficulty solutions which contain about 5% of polymer. When using solvents of lower boiling point, the whole purification and working up process must if necessary be carried out under pressure.

The treatment of the polymer solution with a precipitant, preferably water or steam, can be effected in different ways. For example the polymer solution may be boiled under reflux with a sufficient amount of water until the complete separation of the inorganic constituents has taken place. It is preferable, in order to avoid a thermo-oxidative degradation of the polymer, to exclude atmospheric oxygen by the use of a current of an inert gas, for example nitrogen free from oxygen, which is bubbled through the solution. Steam, if desired superheated, which is led through the solution, can be used with the same effect.

The amount of filtration aid required depends in general on the degree of inorganic contamination of the polymer; the mutual proportions can be varied within wide limits, but normally an expenditure of about 25 parts of filtration aid to 100 parts of dissolved polymer is sufficient.

The process according to this invention can also be used analogously for the subsequent purification of olefine polymers still containing inorganic impurities which have been obtained by any polymerization process. For this purpose the said polymers containing impurities are dissolved according to their mean molecular weights in a suitable concentration—in general up to about 5 parts of polymer to 100 parts of solvent—and to this solution, if desired after the previous treatment of the same with water or another precipitant, there is added a suitable amount of the surface-active substance effective as a filter aid and the pure polymer solution separated from the inorganic residue as described above. In practical use the process in accordance with our invention is applicable to all types of polyolefines, which has been prepared by aid of inorganic catalysts, for example for those polyethylenes, referred to in the book by Raff and Allison "High polymers," vol. XI, Polyethylene, New York and London 1956, on the pages 59, 60 and 66 to 81.

The following examples will further illustrate this invention but the invention is not restricted to these Examples. The parts specified in the examples are parts by weight.

*Example 1*

Ethylene is forced in at 50 atmospheres pressure into a suspension of 10 parts of finely dispersed sodium and 10 parts of titanium tetrachloride in 4,000 parts of xylene for 11 hours at 200° C. 870 parts of a crude, brown-colored polymer exhibiting inclusions of metallic sodium are obtained. 100 parts of this crude product are boiled for an hour under reflux with 2,000 parts of xylene and 20 parts of water. The solution is then stirred at 110° to 120° C. for 15 minutes with the addition of 20 parts of gamma-aluminum oxide. The color of the solution thereby becomes much lighter. After allowing to stand for a short time, the solution becomes completely clear and colorless, whereas the sediment exhibits a brownish coloration. The solution decanted from the sediment yields after cooling 92 parts of a pure white polyethylene of the melting point 130° to 134° C. and an average molecular weight of about 80,000. Ash content is undetectable.

The molecular weight derived from viscosimetric determinations is based on the works of Überreiter, Makromol Chemie, 8 (1952), 21; Harris, Journal Pol. Sc. 8 (1952), 353; Duch und Küchler, Zeitschr. f. El. Chem., 60 (1956), 218.

Example 2

100 parts of a polyethylene of the molecular weight 72,000 with an ash content of 0.25% (main constituents aluminum and titanium) are dissolved in 2,000 parts of cumene at 130° to 140° C. and stirred for 15 minutes with 10 parts of bleaching earth. After sedimentation 87 parts of a pure white, ash-free polyethylene are obtained from the solution.

Example 3

Ethylene is forced at a pressure of 35 atmospheres into a suspension of 10 parts of finely dispersed sodium, 10 parts of chromyl chloride and 200 parts of suspended bleaching earth in 4,000 parts of diethylbenzene for 14 hours at 180° C. The dark brown colored reaction mixture is boiled for an hour under reflux with the addition of another 4,000 parts of diethylbenzene and 100 parts of water. After sedimentation, a clear almost colorless solution is obtained which upon cooling deposits 730 parts of a white ash-free polymer of the molecular weight 67,000.

Example 4

100 parts of a polyethylene as in Example 2 are dissolved in 1,500 parts of cyclohexane at 150° C. under pressure. 10 parts of water are introduced, similarly under pressure, and the mixture stirred for 30 minutes. Then 15 parts of kieselguhr are added and the mixture stirred powerfully for a further 30 minutes. The mixture is led over a pressure filter. From the filtrate there are obtained 81 parts of a pure white polyethylene with an ash content of 0.01% by weight.

Example 5

100 parts of a crude polyethylene with a molecular weight of 96,000 and with an ash content of 1.2% by weight (main constituents sodium and chromium) are dissolved in 1,500 parts of cumene at 130° to 140° C., steam is led through for half an hour and then the whole is stirred for 15 minutes with 25 parts of an aluminum silicate (65.4% of $SiO_2$, 11.9% of $Al_2O_3$). After filtering through a fluted paper filter floating in the filtrate there is obtained a clear and colorless solution from which, after cooling, 92 parts of a pure white polyethylene with an ash content of 0.008% by weight and with an unchanged molecular weight can be isolated.

Example 6

100 parts of a polypropylene with a melting point of 145° to 150° C. and with an ash content of 0.87% (main constituents: aluminum and titanium) are dissolved in 2,000 parts of cumene at 140° C. and, after a previous short treatment with steam, stirred for 30 minutes with 20 parts of bleaching earth. After filtration 78 parts of a white polypropylene with an ash content of 0.04% by weight are obtained from the solution.

Example 7

100 parts of a copolymer derived from alpha-butylene and ethylene and having a melting point of 118° C. and an ash content of 1.1% by weight (main constituents: aluminum and titanium) are dissolved in 1,500 parts of cumene at 130° C. and, after previous treatment with steam, stirred for 30 minutes with 25 parts of bleaching earth. After filtration 80 parts of a white copolymer with an ash content of 0.05% by weightt are obtained from the solution.

We claim:

1. The process for reducing the ash content of a polymerized monoolefine containing from 2 to 4 carbon atoms, having metal-containing catalyst residue remaining therein from the polymerization of said olefine, which comprises providing an organic solvent solution of said polymerized olefine containing said catalyst residue, incorporating water with said solution and heating at a temperature above 80° C., incorporating with the thus-treated solution an inorganic solid adsorbent filter-aid at a temperature above 80° C., and separating said solid filter-aid containing said catalyst residue thereon from the resulting solution of said polymerized olefine having reduced ash content.

2. The process defined in claim 1 wherein said organic solvent has a boiling point under atmospheric pressure above about 130° C.

3. The process defined in claim 1 wherein said organic solvent is cumene.

4. The process defined in claim 1 wherein said filter-aid is selected from the group consisting of gamma-aluminum oxide, silicon dioxide, kieselguhr, bleaching earth, bentonite, and montmorrillonite.

5. The process defined in claim 1 wherein said organic solvent is cumene and said filter-aid is bleaching earth.

6. The process defined in claim 1 wherein said polymerized olefine is a polymer of ethylene, said organic solvent is cumene, and said filter-aid is selected from the group consisting of gamma-aluminum oxide, silicon dioxide, kieselguhr, bleaching earth, bentonite, and montmorrillonite.

7. The process defined in claim 1 wherein said polymerized olefine is a polymer of propylene, said organic solvent is cumene, and said filter-aid is selected from the group consisting of gamma-aluminum oxide, silicon dioxide, kieselguhr, bleaching earth, bentonite, and montmorrillonite.

8. The process for reducing the ash content of a polymerized monoolefine containing from 2 to 4 carbon atoms, having metal-containing catalyst residue remaining therein from the polymerization of said olefine, said metal including a metal of one of the 4th to 6th subgroups of the periodic system of the elements, which comprises providing an organic solvent solution of said polymerized olefine containing said catalyst residue, incorporating water with said solution and heating at a temperature above 80° C., incorporating with the thus-treated solution an inorganic solid adsorbent filter-aid at a temperature above 80° C., and separating said solid filter-aid containing said catalyst residue thereon from the resulting solution of said polymerized olefine having reduced ash content.

9. The process for reducing the ash content of polyethylene having titanium-containing catalyst residue remaining therein from the polymerization of ethylene, which comprises providing an organic solvent solution of said polyethylene containing said catalyst residue, incorporating water with said solution and heating at a temperature above 80° C., incorporating with the thus-treated solution at a temperature above 80° C. a solid adsorbent filter-aid selected from the group consisting of gamma-aluminum oxide, silicon dioxide, kieselguhr, bleaching earth, bentonite, and montmorrillonite, and separating said solid filter-aid containing said catalyst residue thereon from the resulting solution of polyethylene having reduced ash content.

10. The process defined in claim 9 wherein said organic solvent is cumene.

11. The process defined in claim 10 wherein said filter-aid is bleaching earth.

12. The process of purifying polyethylene which comprises dissolving solid polyethylene containing from 0.25% to 1.2% of metal-containing polymerization catalyst residue in an organic solvent, contacting the solution with water at a temperature above 80° C. to precipitate said catalyst residue, admixing with the thus-treated solution at a temperature above 80° C. a solid adsorbent filter-aid selected from the group consisting of gamma-aluminum oxide, silicon dioxide, kieselguhr, bleaching earth, bentonite, and montmorrillonite, separating said filter-aid containing said catalyst residue thereon from the resulting solution of polyethylene, and recovering from said resulting solution solid substantially ash-free polyethylene.

References Cited in the file of this patent

UNITED STATES PATENTS

| | | |
|---|---|---|
| 2,356,128 | Thomas et al. | Aug. 22, 1944 |
| 2,374,272 | Carpenter et al. | Apr. 24, 1945 |
| 2,565,960 | Garber et al. | Aug. 28, 1951 |
| 2,636,016 | Gilder | Apr. 21, 1953 |
| 2,703,783 | Popkin | Mar. 8, 1955 |
| 2,725,374 | Mosher | Nov. 29, 1955 |
| 2,731,452 | Field et al. | Jan. 17, 1956 |
| 2,838,477 | Roelen et al. | June 10, 1958 |
| 2,849,429 | Cines | Aug. 26, 1958 |
| 2,886,561 | Reynolds et al. | May 12, 1959 |